(12) United States Patent
Horley et al.

(10) Patent No.: US 8,498,373 B2
(45) Date of Patent: Jul. 30, 2013

(54) GENERATING A REGULARLY SYNCHRONISED COUNT VALUE

(75) Inventors: John Michael Horley, Hauxton (GB); Sheldon James Woodhouse, Caythorpe (GB); Michael John Williams, Ely (GB); Sheshadri Kalkunte, Bangalore (IN); Andrew Christopher Rose, Great Shelford (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/348,862

(22) Filed: Jan. 12, 2012

(65) Prior Publication Data

US 2013/0070879 A1 Mar. 21, 2013

(30) Foreign Application Priority Data

Sep. 20, 2011 (IN) .............................. 2727/DEL/2011

(51) Int. Cl.
*H03L 7/00* (2006.01)
(52) U.S. Cl.
USPC ............ 377/118; 327/141; 327/144; 327/145
(58) Field of Classification Search
None
See application file for complete search history.

(56) References Cited

U.S. PATENT DOCUMENTS

| | | | |
|---|---|---|---|
| 5,166,959 A * | 11/1992 | Chu et al. | 377/20 |
| 6,049,887 A * | 4/2000 | Khandekar et al. | 713/503 |
| 6,175,603 B1 * | 1/2001 | Chapman et al. | 375/354 |
| 2003/0065936 A1 * | 4/2003 | Wray | 713/200 |
| 2004/0049706 A1 * | 3/2004 | Strong | 713/400 |
| 2010/0001769 A1 * | 1/2010 | Brantley et al. | 327/144 |

* cited by examiner

*Primary Examiner* — Tuan T Lam
(74) *Attorney, Agent, or Firm* — Nixon & Vanderhye P.C.

(57) ABSTRACT

A count value generator includes an input for receiving a synchronizing count value, a counter configured to increment at a local frequency, the local frequency being faster than the synchronizing frequency, and an interpolator for determining a frequency ratio between the local frequency and the synchronizing frequency and for determining an increment value for the counter dependent on a relative amount of a maximum value of the counter with respect to the frequency ratio is disclosed. The counter generates a count value including a predetermined number of bits representing integer values and output as the lower order bits of the output count value and additional lower order bits that represent fractional portions of the integer values. The counter includes output circuitry for outputting the synchronizing count value and the predetermined number of bits representing integer values generated by the counter as the lower order bits of the count value.

22 Claims, 6 Drawing Sheets

GENERATING A REGULARLY SYNCHRONISED COUNT VALUE

BACKGROUND OF THE INVENTION

1. Field of the Invention

This application claims priority to Indian Application No. 2727/DEL/2011 filed 20 Sep. 2011, the entire contents of which are incorporated herein by reference.

The field of the invention relates to counters and in particular to generating a count value from a slow incrementing counter and a faster clock signal.

2. Description of the Prior Art

Counters that provide count values that increment in response to a clock signal are known. These count values can be used as an indication of a current time provided that the clock signal driving the counter has a constant frequency that is known.

In data processing systems it is often useful, for example when diagnosing a system, to know the relative time that certain events happened with respect to other events. In order to be able to determine this count values that are used as timestamps can be added to various transactions as they pass through a data processing system. However, as data processing systems get larger and have different clock frequency domains, and indeed domains that are clocked at frequencies that vary with time, it is difficult to provide a timestamp that is consistent across a system.

A further constraint associated with the provision of timestamp information is the power demands associated with such provision. Timestamps that are generated for debug purposes for example, require a relatively high clock frequency in order to provide sufficiently high resolution, however as the time value is required to run continuously a high frequency clock will clearly consume significant power.

It would be desirable to be able to provide a count value in response to a local clock signal that could be related to a count value generated in response to a different local clock signal. It would also be desirable to be able to reduce the power associated with the generation of such count values.

SUMMARY OF THE INVENTION

A first aspect of the present invention provides a count value generator for generating an output count value comprising: an input for receiving a synchronising count value that increments at a synchronising frequency; a counter configured to increment in response to a local clock signal running at a local frequency, said local frequency being faster than said synchronising frequency; and an interpolator for determining a frequency ratio between said local frequency and said synchronising frequency and for determining an increment value for said counter dependent on a relative amount of said maximum value of said counter with respect to said frequency ratio; wherein said counter is configured to generate a count value comprising a plurality of bits, said plurality of bits comprising a predetermined number of bits representing integer values and being output as said lower order bits of said output count value, said counter being configured to be incremented by said increment value in response to said local clock signal such that said counter attains said maximum value or a value close to said maximum value prior to said synchronising count value incrementing, said counter being configured to be reset in response to said synchronising count value incrementing; and output circuitry for outputting said synchronising count value as higher order bits of said output count value and said predetermined number of bits representing integer values generated by said counter as said lower order bits of said output count value.

The present invention recognises that with local clock frequencies varying between domains and sometimes varying with time, in order to be able to generate a count value that can be related to other count values, a slower synchronising count value can be used to synchronise between the different domains. This count value can be used to generate the higher order bits of the count value, the lower order bits of the count value can then be generated using the local clock provided that one ensures that the increments made in response to the local clock signal are such that the lower order bits saturate or nearly saturate between each increment of the higher order bits. This can be done by determining the ratio between the two frequencies and providing a suitable increment value for the lower order bits in dependence upon this.

In some embodiments, said interpolator is configured to determine said relative amount of said maximum value of said counter with respect to said frequency ratio by dividing said maximum value by said frequency ratio.

One reasonably simple way of determining the relative amount of the saturated value of the counter with respect to the frequency ratio is by dividing the maximum value by the frequency ratio. It should be noted however that division is relatively complicated to implement electronically and requires a substantial number of gates and thus, particularly in cases where only a few sets of possible frequency values are supported it may be more advantageous to use a lookup table that stores the possible frequency values and their resultant ratios.

In some embodiments, said counter further comprises a clock signal generator for generating said local clock signal.

The local clock signal may be generated by a clock signal generator within the count value generator or the clock signal may be received at an input to the count value generator. For example, in a particular domain that is being clock by this local clock signal the count value generator may receive the local clock signal from an external clock signal generator that is also used to clock the other elements within this particular clock domain.

In some embodiments, said interpolator is configured to respond to changes in at least one of said synchronising, frequency and said local frequency to re-determine said frequency ratio, said relative amount of said maximum value of said counter with respect to said frequency ratio and said increment value.

One advantage of embodiments of the present invention is that as the interpolator determines the increment value from the frequency ratio and the saturated value of the counter then if either of the frequencies change the interpolator can simply calculate a new increment value and the count value generator can operate at this new frequency. Thus, either the local frequency or the synchronising frequency may change and the device can still operate correctly. This can be particularly useful in some systems where these frequencies vary depending on perhaps the power domain that the device is operating within.

In some embodiments, said interpolator comprises a frequency ratio counter for determining said ratio between said local frequency and said synchronising frequency, said frequency ratio counter being configured to start and stop counting in response to said synchronising count value incrementing and to increment in response to said local clock signal.

Although the frequency ratio can be determined in a number of ways, one simple way of determining it is by using a counter that counts the number of local clock pulses that occur between pulses of the synchronising clock and is reset in response to the synchronising count value incrementing. In this simple way the ratio between the two frequencies can be determined.

In some embodiments said frequency ratio counter comprises said counter, said count value generator comprising control circuitry responsive to detecting a change in at least one of said synchronising frequency and said local frequency to reset said counter and to count a number of local clock frequency cycles that occur during a time said synchronising count value increments.

Although a separate counter can be used to determine the frequency ratio, it may be more area efficient to use the counter that is used for generating the lower order bits of the count value to determine the frequency ratio. This can be done by using control circuitry that in response to detecting a change in one of the frequencies resets the counter and uses it to count the number of local clock pulses that occur during a clock pulse of the synchronising counter. This value can then be used to determine a suitable increment value for this counter when it is being used to generate the count value.

In some embodiments said interpolator is configured to respond to changes in said synchronising frequency to re-determine said frequency ratio, said relative amount of said maximum value of said counter with respect to said frequency ratio and said increment value, and to determine whether a number of higher order bits output as said output count value by said synchronising counter should be changed, such that a different number of higher order bits are output, a number of bits output by said counter being changed in a complementary manner such that a same number of bits are output as said count value.

In addition to determining a new increment value, a change in the synchronising frequency may trigger a change in the source of the number of higher order bits and lower order bits that are output as the output count value. Where for example the synchronising frequency increases then it may be suitable for the synchronising count value to generate some of the lower order bits of the output count value these bits previously being generated by the counter clocked by the local clock. While in response to said synchronising frequency decreasing a fewer number of higher order bits are generated from said synchronising count value and a greater number of bits are generated by said counter.

In some embodiments, said counter is a saturating counter.

It is important that the counter does not wrap round as it generates the lower order bits of the count value, wrapping round may give the impression that the counter is counting backwards. Thus, a saturating counter may be a suitable counter to use. If the design is such that the counter will never increment beyond its maximum value then a saturating counter is suitable but not essential.

In some embodiments, said counter comprises a time stamp generator, said output count value being indicative of a current time.

One use of the counter may be as a time stamp generator. It is often important that the relative time that an event occurred can be determined within a processing system. Where there are different clock signals operating at different frequencies it can be difficult to generate a time stamp without transmitting a fast frequency clock throughout the system which is expensive on power. Using counters of embodiments of the present invention that are synchronised to a slow frequency value which is sent throughout a system and yet which have the resolution of the local clock is a convenient and power efficient way of generating time stamps.

In some embodiments, a size of said counter is dependent upon a frequency ratio between a slowest synchronising frequency and a fastest local frequency that said count value generator is configured to operate at, such that a maximum count value of said predetermined number of lower order bits is greater than said frequency ratio and a number of said additional lower order bits is selected dependent upon a desired accuracy.

The size of the counter within the count value generator must be large enough to be able to represent the frequency ratio between the slowest possible synchronising frequency and the fastest possible local frequency as this is the value that should be counted to between increments of the synchronising clocks. The counter can have additional bits that are used to improve the accuracy of the increment value allowing it to occur at evenly spaced increments during each period of the slower clock frequency. In this regard it should be noted that as the counter will be a binary counter and will increment in integer values, a potential problem may arise where the ratio between the frequencies is not be an integer value. This potential problem is dealt with by providing a counter that has more bits than is required to represent the lower order bits of the count value, the additional bits are then used to provide what can be considered to be fractional values thereby allowing many more increment possibilities.

In this way even where a local clock has a frequency that varies with time a suitable count signal can be generated by varying the required increment. This count signal will have the resolution of the higher clock frequency and yet be synchronised with the slower frequency.

In some embodiments, said counter comprises a lowest order portion comprising bits that are not output and represent a fractional portion of said count value, a lower order portion comprising the lowest order bits of said output count value, said lowest and lower order portions being incremented by addition of said increment value and a further portion representing higher order bits output by said counter said further portion being incremented by one in response to an overflow indicator from said lower order portion.

The counter may be designed in a number of ways. In some embodiments it is found to be convenient to add the increment value to the lower and lowest order bits using an adder and to simply increment by 1 the higher order bits using a signal triggered by an overflow from the lower order bits. Incrementing by 1 is a simple function to build electronically and thus, as the higher order bits will always change value by incrementing by 1 this is an efficient way of generating the circuitry required to control the counter.

A second aspect of the present invention provides an integrated circuit comprising a plurality of clock domains configured to operate at a plurality of frequencies, said integrated circuit comprising a synchronising counter for generating a synchronising count value and a plurality of clock domains clocked by local clock signal generators, said local clock signal generators each being configured to operate at a higher frequency than a frequency at which said synchronising counter increments: wherein at least two of said plurality of clock domains comprise a counter according to a first aspect of the present invention.

A clock value generator according to embodiments of the present invention are particularly suitable for use with integrated circuits that have different clock domains. The transmission of a synchronising count value that increments at a slow clock frequency to different portions of the integrated circuit can be done relatively simply and in a power efficient manner. A locally generated higher resolution count value can then be provided by providing lower order bits generated from a local clock that is operating in a higher frequency domain. This makes use of the local clock and avoids the need to transmit high frequency clock signals throughout the system. Furthermore, the portions of the integrated circuit between the different domains may only operate at lower clock frequencies such that it may be difficult to transmit higher clock frequencies through these portions, or doing so may require the circuit to be redesigned to have portions that can operate at higher clock frequencies between the clocking domains which would again increase power consumption. The synchronising count value allows count values generated in the different clock domains to be related to each other while the use of the local clocks enables high resolution count values to be generated that can be synchronised with each other and yet do not require a high power to generate.

In some embodiments, said at least two of said plurality of clock domains each comprise a time stamp generator for generating a time stamp indicating a current time, said time stamp generators comprising said count value generators.

One particularly useful implementation is where these count values generators generate time stamps. As noted previously it is useful to be able to determine a relative time with which different events occur within a data processing system. Where these systems use different clock domains and are possibly remote from each other it may be difficult to determine these times consistently across the system. The use of the slow frequency synchronising count value enables count values in the different domains to be synchronised with each other while the use of local clocks provide higher resolution without the need to transmit these clocks throughout the system.

A third aspect of the present invention provides method of generating an output count value comprising: receiving a synchronising count value that increments at a synchronising frequency; determining a frequency ratio between said local frequency of a local clock signal and said synchronising frequency, said local frequency being faster than said synchronising frequency and determining an increment value for a counter dependent on a relative amount of a maximum value of said counter with respect to said frequency ratio; incrementing said counter by said increment value in response to said local clock signal running at said local frequency such that said counter attains said maximum value or a value close to said maximum value prior to said synchronising count value incrementing; resetting said counter in response to said synchronising count value incrementing; generating and outputting a count value; said step of generating and outputting a count value comprising said counter generating a plurality of bits, said plurality of bits comprising: a predetermined number of bits representing integer values and being output by said counter as said lower order bits of said count value that is output, and outputting said received synchronising count value as higher order bits of said output count value.

A fourth aspect of the present invention provides a count value generator means for generating an output count value comprising: an input means for receiving a synchronising count value that increments at a synchronising frequency; a counting means for incrementing in response to a local clock signal running at a local frequency, said local frequency being faster than said synchronising frequency; and an interpolating means for determining a frequency ratio between said local frequency and said synchronising frequency and for determining an increment value for said counting means dependent on a relative amount of a maximum value of said counting means with respect to said frequency ratio; wherein said counting means is for generating a count value comprising a plurality of bits, said plurality of bits comprising a predetermined number of bits representing integer values and being output as said lower order bits of said output count value, said counting means being for incrementing by said increment value in response to said local clock signal such that said counting means attains said maximum value or a value close to said maximum value prior to said synchronising count value incrementing, said counting means being configured to be reset in response to said synchronising count value incrementing; and output means for outputting said synchronising count value as higher order bits of said count value and said predetermined number of bits representing integer values generated by said counting means as said lower order bits of said count value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
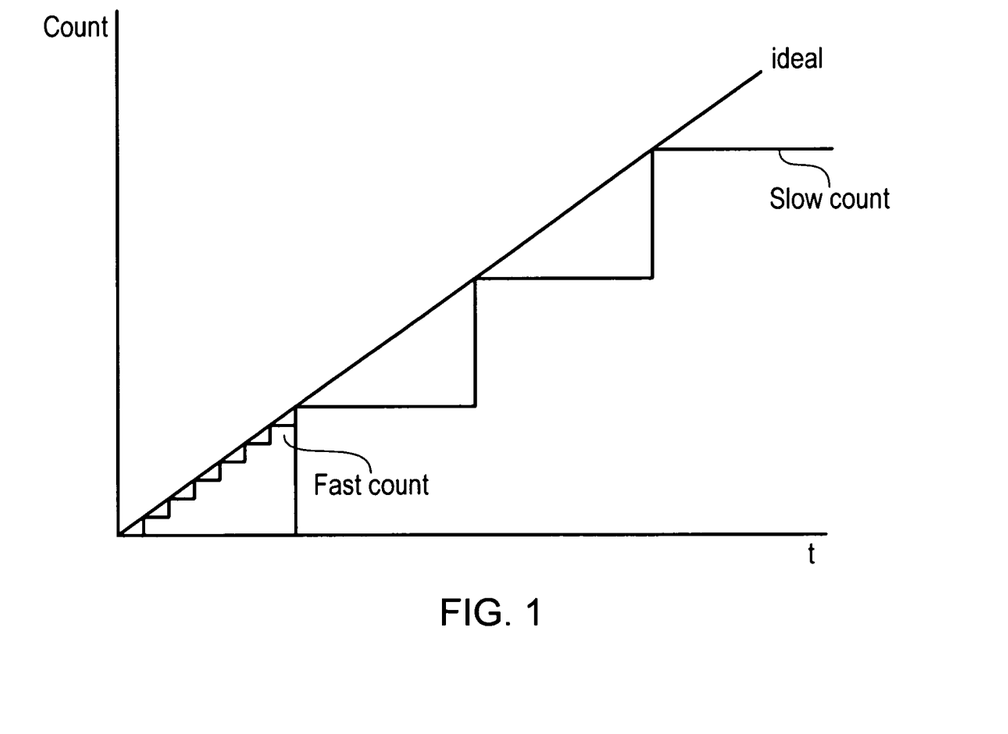
FIG. 1 schematically shows a count value incrementing with time at different frequencies.

FIG. 1 shows schematically how a count value varies with time when it increments at a slow frequency the large step showing a slow count, or when it increments at a faster frequency the smaller steps illustrated a fast count. As can be seen the fast count steps follow the "ideal" line more closely and if they are being used to provide an estimate of time provide a more accurate idea of current time than the slower count steps.

Embodiment of the current invention are concerned with using a faster clock to provide the smaller steps by generating the lower order bits of a count value and thereby providing a count value with higher resolution, while generating the higher order bits of a count value from a slower count value. The slower count value can be used as a synchronising count value where different fast clocks can be used to provide intermediate steps which are synchronised by the slower stepped slow count value.

Figure 2:
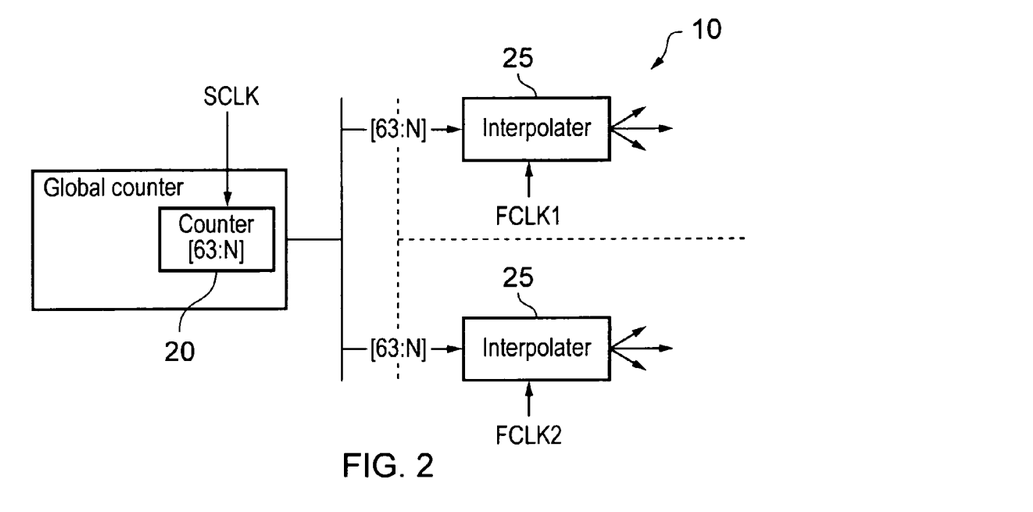
FIG. 2 schematically shows a circuit for generating count values in different time domains according to an embodiment of the present invention.

FIG. 2 shows schematically a circuit 10 for generating such count values in two different clock domains. Thus, in this embodiment there is synchronising counter 20 that is clocked by slow synchronising clock SCLK and counts at this frequency. This count value is sent to two different domains and interpolators 25 within these different domains receive both this count value and their own faster clocks FCLK1 FCLK2 respectively. The interpolators 25 have counters within them that are clocked by their respective faster clocks and provide the lower order bits of a count value, while the count value received from counter 20 provide the higher order bits of this count value. Thus, a count value that increments in the smaller faster steps as shown in FIG. 1 but is synchronised at each slower step is generated. As FCLK1 and FCLK2 may be different frequencies, the smaller step sizes will be different but the count values will be synchronised each time counter 20 increments.

Figure 3:
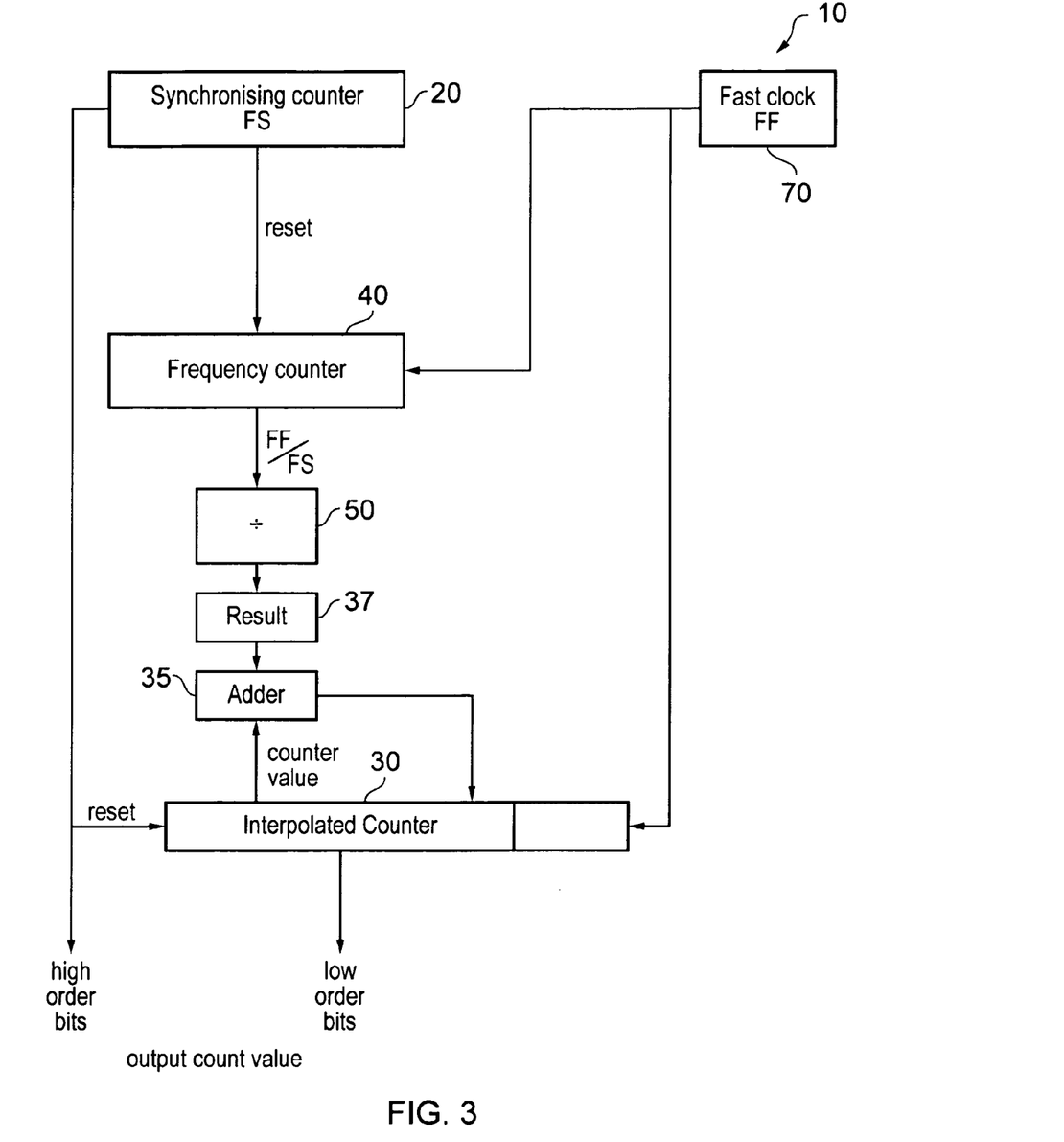
FIG. 3 schematically shows a counter according to an embodiment of the present invention.

FIG. 3 schematically shows a counter 10 according to an embodiment of the present invention. In this embodiment here is a synchronising counter 20 which operates at a slow frequency $F_S$ and generates a slow count which provides the high order count value bits of the output count value. There is also a local faster clock 70 which operates at a frequency $F_F$ and is used to clock an interpolated counter 30.

In this embodiment there is also a frequency counter 40 which is used to count how many fast clock cycles occur during a cycle of the synchronising counter, that is the ratio of Fs and $F_F$. This is used to determine how many of the small fast count steps will occur between the slow count steps in FIG. 1. In this embodiment this is shown as a separate counter 40 which is used during initiation and may be used later if either of the frequencies $F_F$ or Fs vary. Although in this embodiment it is shown as a separate counter, it can in some embodiments be implemented using interpolated counter 30 and some additional control circuitry. In such a case at initiation or following detection of one of the clock frequencies changing the interpolated counter 30 is reset and the number of clock cycles of the fast clock that occur during a clock cycle of the synchronising counter is counted and this is used as the ratio between the synchronising counter and the fast clock counter. This value only needs to be determined at initiation or following a change in one of the clock frequencies and thus, it may be more area efficient to use the interpolated counter to determine this ratio rather than having an additional counter.

The ratio of these two frequencies is required to determine an appropriate increment value for the interpolated counter 30. Thus, this value is input to divider 50 which divides the maximum counter value of the interpolated counter 30 by this ratio to determine the increment that is required such that if this increment is applied to the interpolated counter at each clock cycle of the fast clock frequency during a clock cycle of the synchronising counter 20 the interpolated counter 30 will achieve its maximum value or a value very close to its maximum value. At the end of the synchronising counter clock cycle the interpolated counter is reset, thus in each clock cycle it counts from zero to approximately its maximum value.

Thus, the value calculated by the divider 50 is the increment to be applied to the interpolated counter 30 at each clock step. This increment is applied to register 37 and adder 35 adds the value in register 37 to the current value of the interpolated counter. At each clock cycle of the fast clock the result in register 37 is input into the interpolated counter 30 which then counts in these increments. Each time the synchronising counter increments its value the interpolated counter 30 is reset.

The interpolated counter 30 has a certain size. It must have enough bits to output the lower order count value bits that are required to be output along with the higher order bits from the synchronising counter to provide the count value. In this embodiment it also has some additional bits that are not output but allow the faster steps to be more equally spaced within the synchronising count steps.

In this regard if one were to consider for example that the fast count is twenty times faster than the slow count then the interpolated counter will be incremented twenty times during each of the a synchronising counter's steps. Thus, the interpolated counter 30 must output at least a value of 20 to be able to increment 20 times. However, as it is a binary counter it cannot be sized to have a maximum value of 20, to provide at least a 20 it needs to be a five bit counter which therefore has a maximum output value of 32. In order for this counter to provide 20 approximately equally spaced count steps one would need a counter that counts to 32 to be incremented by 1.6 at each step. Clearly one cannot increment a counter which is 5 bits wide by 1.6. However, if one were to add additional bits and consider them as fractional bits that are provided to allow the steps to be more evenly spaced but are not output one could increment the counter by a value that is at least very close to 1.6 by using these additional bits. For example, if one provided a 9-bit counter and used an increment of 25, one would see then see the lower order bits that are output incrementing by for example 0, 1, 3, 4, 6, 7, 9 while the lowest order bits would be invisible and would not be output but would allow the bits that are output to step in a non-linear manner in response to a constant increment value.

The size of the counter required to provide suitable accuracy can be selected when one knows the possible frequencies of the slow and fast clocks and the required resolution of the count value.

It is important that the interpolated counter 30 does not wrap around as if it did it would appear that the count value output was counting backwards. Thus, one can either select the incrementing value to make sure that one never reaches the maximum counter value or one can make sure that the interpolated counter 30 is a saturating counter.

It is also important that if the interpolating counter replaces any of the lower order bits of the synchronising counter, as opposed to just adding additional lower order bits as is shown in the above example, then it is important that the bits it replaces are zero, otherwise an older time than that represented by the synchronising counter might be output.

To avoid the need for these lower-order bits to be zero they can in some embodiments be passed into the interpolated counter 30 where they are added to the internally generated count. In other respects the interpolated counter 30 operates as described above.

Figure 4:
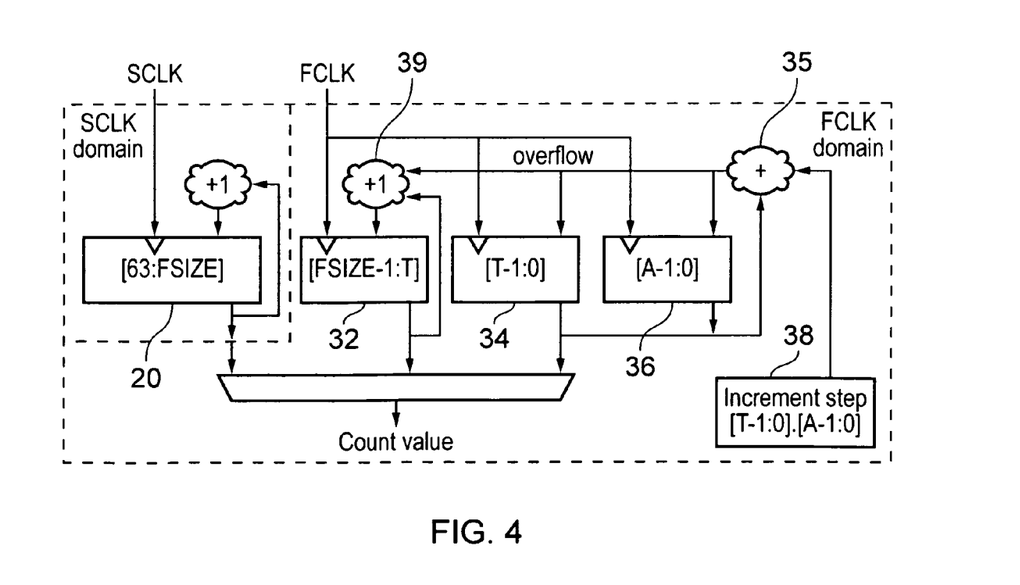
FIG. 4 shows a further embodiment of a counter according to an embodiment of the present invention.

FIG. 4 shows a further embodiment of a counter according to an embodiment of the present invention. In this embodiment there is a synchronising counter 20 that increments in response to a synchronising clock and is within the synchronising clock domain and there are additional counters 32, 34, 36 that together make up the interpolated counter 30. These operate in the FCLK faster clock domain.

Register 38 holds an increment step and adder 35 adds this increment to the current value in counter 30 and this is used to update the counter 30. In this embodiment counter 30 is divided into three separate counters and the increment value is added to the lower order bit counters 34 and 36, while higher order bit counter 32 is updated in response to incrementer 39, which adds a one to the value within this counter in response to an overflow signal received from the counter 34.

It is recognised that higher order bits will only ever be incremented by 1 and incrementing by 1 is far more circuit efficient to implement than an adder for adding a value is. Thus, if one implements interpolated counter 30 with several counters one can use an incrementer to increment the counter providing the higher order bits of the count value while using an adder to provide the increments to the lower order bits of the count value. The incrementer 39 is controlled by an overflow from the lower order counters.

In this embodiment the lowest order counter 36 counts the "invisible" bits that are not output but allow the increment steps that are output to follow the ideal line of FIG. 1 more closely. Counters 34 and 32 provide the lower order bits of the count value that are output while the bits from counter 20 provide the higher order bits.

Although in this embodiment the interpolated counter 30 is implemented as three different counters 32, 34 and 36 it could in other embodiments be implemented by more or fewer counters. Each of the three counters is reset in response to the synchronising counter 20 incrementing.

Figure 5:
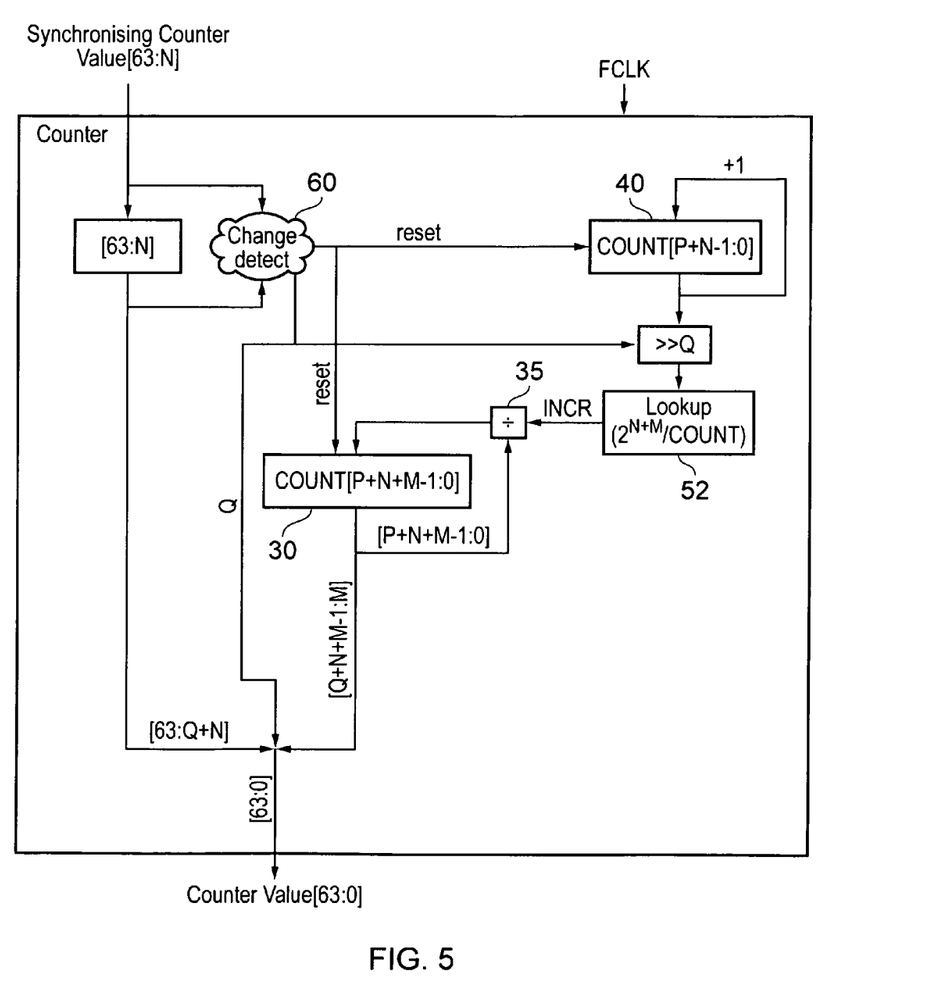
FIG. 5 shows a further embodiment of a counter which changes the increment step of the counter in response to a change in synchronising count frequency.

FIG. 5 shows a further embodiment of a counter which changes the increment step of the counter in response to a change in synchronising count frequency. In this embodiment there is a frequency change detect circuit 60 for detecting changes in the synchronising count frequency. The synchronising counter that counts at the synchronising count frequency provides the higher order bits of the count value and this count value is generally chosen to have a relationship to an actual time value. If the synchronising count frequency changes then so will the relationship of this count with the time value. This can be compensated for by changing the number of bits that this counter outputs as the higher order bits.

If the number of higher order bits that are output are changed then the bits output by the interpolated counter 30 will also need to be changed. In this embodiment these adjustments are made by adjusting the Q factor which controls the number of bits output by the synchronising counter 20 and the number of bits output by the interpolated counter 30. Thus, in response to detecting a change in the synchronising frequency value using detector 60 the Q value is changed and this affects the number of bits output by the synchronising counter 20 and the interpolated counter 30. In this way the counter value is adjusted such that it has a similar relationship to time to the relationship it had before the frequency change. Thus, if the frequency of the synchronising counter increased, it may be more appropriate for more bits to be output and fewer bits of the interpolated counter 30, while if it decreased, then it may be appropriate for fewer higher order bits to be output by the synchronising counter 20 and more by the interpolated counter 30.

Thus, when frequency change detect circuit 60 detects a change in the frequency of the synchronising clock it resets counter 40 that counts the number of clock cycles of the fast clock to the slow synchronising clock. The newly determined ratio of the fast clock to the synchronising clock is used to determine what a suitable number of bits of the count value to be output from each of the counters is and thus, is used to reset the Q value. A change in the frequency ratios will also change the increment to be added to counter 30 and in this embodiment this is determined from lookup table 52. Lookup table 52 stores a number of possible ratios of frequencies that the circuit is configured to operate at along with the appropriate increment value for these ratios. Determining the increment value in this way is area efficient where a circuit is configured to operate at only a few selected frequencies. In such a case and given a constant sized interpolated counter 30 one can store the possible increment values alongside the ratios of the frequencies such that one can simply look these up rather than performing the calculation using a divider as is shown in the embodiment of FIG. 3.

In other aspects the device of FIG. 5 operates in a similar manner to the device of FIG. 3.

Figure 6:
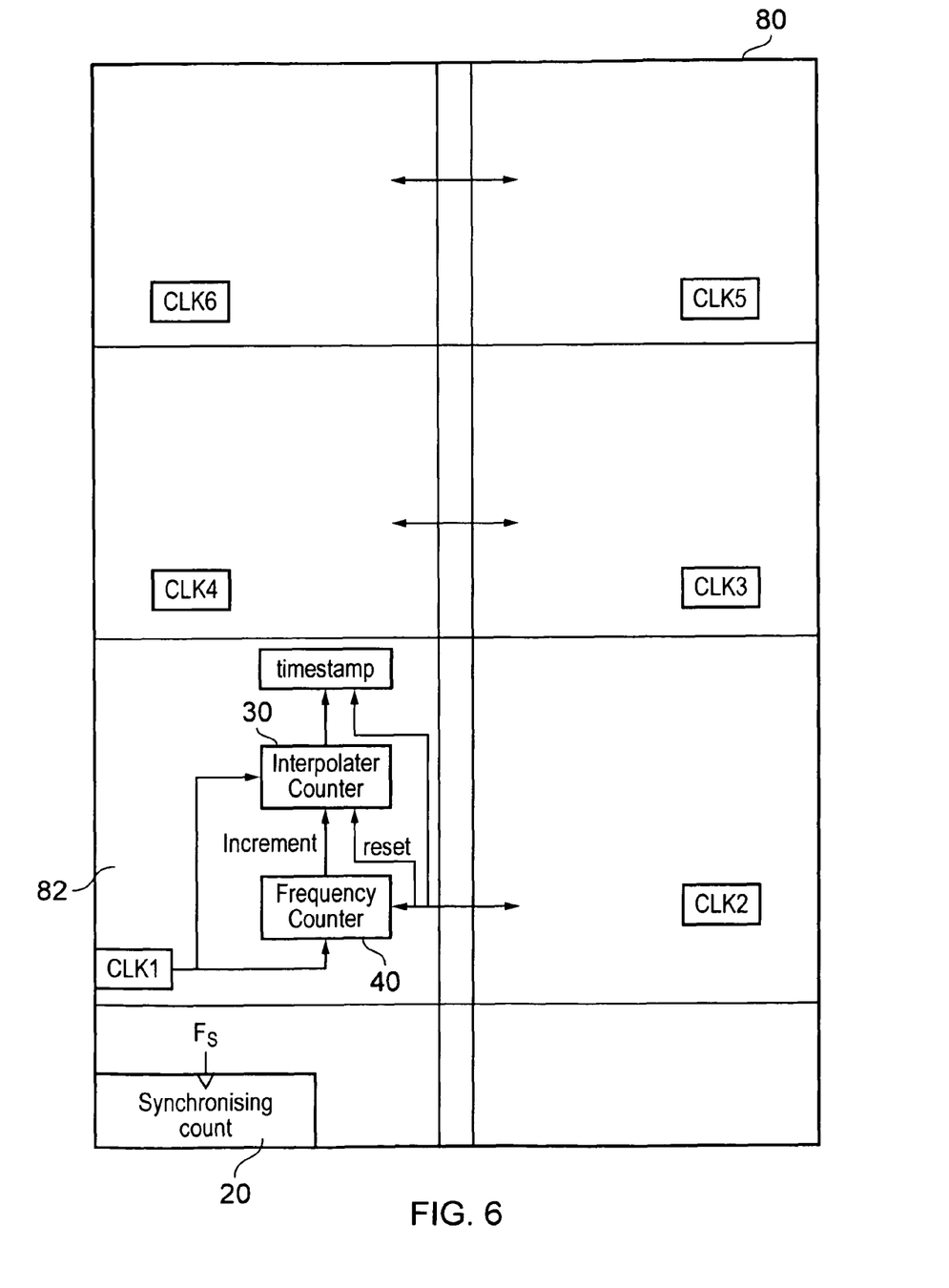
FIG. 6 shows an integrated circuit with several clock domains according to an embodiment of the present invention.

FIG. 6 shows an integrated circuit 80 according to an embodiment of the present invention. Integrated circuit 80 comprises a plurality of local clocked domains clocked by local clocks clk1-clk6. These may operate at one frequency or they may operate at different frequencies that change with time perhaps in dependence upon the power in a battery.

There is a synchronising counter 20 that counts at a synchronising frequency $F_S$ and whose count value is distributed to the different domains of the integrated circuit 80. As this counter counts at a relatively slow frequency the power overheads associated with transmitting it through the integrated circuit 80 are not too great. Clock domain 82 is shown in detail and comprises a local clock clk1 that clocks counter 30. This signal is also input to frequency counter 40 that also receives the synchronising count signal and from the ratio of these two frequencies determines the increment to be applied to interpolated counter 30. A timestamp value is then generated from the count value of the synchronising counter 20 and the count value of the interpolated counter 30, the lower bits of the timestamp value coming from the value of the interpolated counter 30. This timestamp value may be added to transactions that are executed within domain 82. Timestamps generated in a similar way in other clock domains on the integrated circuit may be added to transactions that are executed in these domains. As the timestamp values all have high order bits generated by the same synchronising counter 20, they can be related to each other and relative timings of these transactions in the different domains can be determined. This can be very useful in diagnosing any problems within the system.

Figure 7:
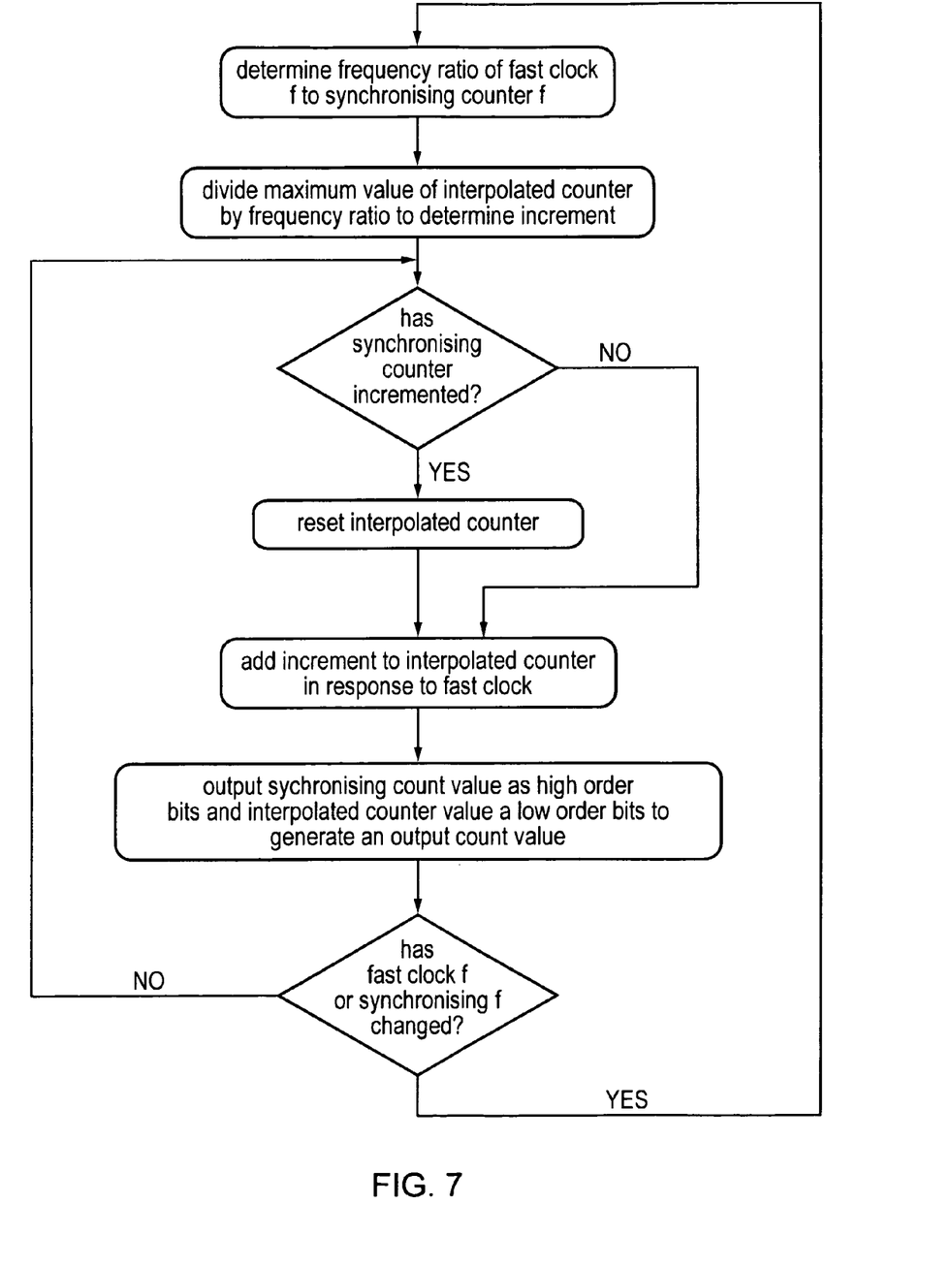
FIG. 7 shows a flow diagram illustrating steps in a method according to an embodiment of the present invention.

FIG. 7 shows a flow diagram illustrating steps in a method according to an embodiment of the present invention.

In the initial step the frequency ratio of the fast clock to the synchronising counter frequency is determined. The maximum value of the interpolated counter is then divided by this frequency ratio and this determines the increment to be applied to the interpolated counter.

It is then determined whether or not the synchronising counter has incremented. Every time the synchronising counter increments then the interpolated counter is reset. If the synchronising counter has not incremented then the interpolated counter is incremented in response to the fast clock by the increment value that was calculated by dividing the maximum value of the interpolated counter by the frequency ratio. As the interpolating counter increments the value held in the counter is output as the lower order bits of the count value with the higher order bits being output from the synchronising counter.

It is periodically determined whether the fast clock frequency or the synchronising frequency have changed. If they have then the increment to be applied to the interpolating counter will also need to be changed and thus, the ratio between the frequencies and the ratio of this ratio to the maximum value of the interpolated counter is calculated again to determine a new increment. It should be noted that if it is the synchronising clock that has changed then it may be necessary to calculate the Q factor that is shown in FIG. 5 and determines the number of bits to be output from each of the counters to form the output count value. This is not shown in a flow diagram of FIG. 7.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A count value generator for generating an output count value comprising:
   an input for receiving a synchronising count value that increments at a synchronising frequency;
   a counter configured to increment in response to a local clock signal running at a local frequency, said local frequency being faster than said synchronising frequency; and
   an interpolator for determining a frequency ratio between said local frequency and said synchronising frequency and for determining an increment value for said counter dependent on a relative amount of a maximum value of said counter with respect to said frequency ratio;
   wherein said counter is configured to generate a count value comprising a plurality of bits, said plurality of bits comprising a predetermined number of bits representing integer values and being output as said lower order bits of said output count value, said counter being configured to be incremented by said increment value in response to said local clock signal such that said counter attains said maximum value or a value close to said maximum value prior to said synchronising count value incrementing, said counter being configured to be reset in response to said synchronising count value incrementing; and
   output circuitry for outputting said synchronising count value as higher order bits of said count value and said predetermined number of bits representing integer values generated by said counter as said lower order bits of said count value.

2. A count value generator according to claim 1, wherein said interpolator is configured to determine said relative amount of said maximum value of said counter with respect to said frequency ratio by dividing said maximum value by said frequency ratio.

3. A count value generator according to claim 1, wherein said interpolator is configured to determine said relative amount of said maximum value of said counter with respect to said frequency ratio by using a look up table storing a set of said values.

4. A count value generator according to claim 1, said counter further comprising a clock signal generator for generating said local clock signal.

5. A count value generator according to claim 1, wherein said interpolator is configured to respond to changes in at least one of said synchronising frequency and said local frequency to re-determine said frequency ratio, said relative amount of said maximum value of said counter with respect to said frequency ratio and said increment value.

6. A count value generator according to claim 1, wherein said interpolator comprises a frequency ratio counter for determining said ratio between said local frequency and said synchronising frequency, said frequency ratio counter being configured to start and stop counting in response to said synchronising count value incrementing and to increment in response to said local clock signal.

7. A count value generator according to claim 6, wherein said frequency ratio counter comprises said counter, said count value generator comprising control circuitry responsive to detecting a change in at least one of said synchronising frequency and said local frequency to reset said counter and to count a number of local clock frequency cycles that occur during a time said synchronising count value increments.

8. A count value generator according to claim 1, wherein said interpolator is configured to respond to changes in said synchronising frequency to re-determine said frequency ratio, said relative amount of said maximum value of said counter with respect to said frequency ratio and said increment value, and to determine whether a number of higher order bits output as said output count value by said synchronising counter should be changed, such that a different number of higher order bits are output, a number of bits output by said counter being changed in a complementary manner such that a same number of bits are output as said count value.

9. A count value generator according to claim 8, wherein in response to said synchronising frequency decreasing a fewer number of higher order bits are generated from said synchronising count value and a greater number of bits are generated by said counter.

10. A count value generator according to claim 1, wherein said counter is a saturating counter.

11. A count value generator according to claim 1, wherein said counter comprises a time stamp generator, said output count value being indicative of a current time.

12. A count value generator according to claim 1, wherein a size of said counter is dependent upon a frequency ratio between a slowest synchronising frequency and a fastest local frequency that said count value generator is configured to operate at, such that a maximum count value of said predetermined number of lower order bits is greater than said frequency ratio and a number of said additional lower order bits is selected dependent upon a desired accuracy.

13. A count value generator according to claim 1, wherein said counter is configured to generate said count value comprising said plurality of bits representing said integer values and being output as said lower order bits of said output count value and additional lower order bits that represent fractional portions of said integer values, said additional lower order bits not being output as said output count value.

14. A count value generator according to claim 13, wherein said counter comprises a lowest order portion comprising bits that are not output and represent said fractional portion of said count value, a lower order portion comprising the lowest order bits of said output count value, said lowest and lower order portions being incremented by addition of said increment value and a further portion representing higher order bits output by said counter said further portion being incremented by one in response to an overflow indicator from said lower order portion.

15. An integrated circuit comprising a plurality of clock domains configured to operate at a plurality of frequencies, said integrated circuit comprising a synchronising counter for generating a synchronising count value and a plurality of clock domains clocked by local clock signal generators, said local clock signal generators each being configured to operate at a higher frequency than a frequency at which said synchronising counter increments: wherein at least two of said plurality of clock domains comprise a count value generator according to claim 1.

16. An integrated circuit according to claim 15, wherein said at least two of said plurality of clock domains each comprise a time stamp generator for generating a time stamp indicating a current time, said time stamp generators comprising said count value generators.

17. A method of generating an output count value comprising:
   receiving a synchronising count value that increments at a synchronising frequency;
   determining a frequency ratio between said local frequency of a local clock signal and said synchronising frequency, said local frequency being faster than said synchronising frequency and determining an increment value for a counter dependent on a relative amount of a maximum value of said counter with respect to said frequency ratio;

incrementing said counter by said increment value in response to said local clock signal running at said local frequency such that said counter attains said maximum value or a value close to said maximum value prior to said synchronising count value incrementing;

resetting said counter in response to said synchronising count value incrementing;

generating and outputting a count value;

said step of generating and outputting a count value comprising said counter generating a plurality of bits, said plurality of bits comprising: a predetermined number of bits representing integer values and being output by said counter as said lower order bits of said count value that is output, and outputting said received synchronising count value as higher order bits of said output count value.

18. A method according to claim 17, wherein said step of determining an increment value for a counter dependent on a relative amount of a maximum value of said counter with respect to said frequency ratio comprises dividing said maximum value by said frequency ratio.

19. A method according to claim 17, wherein said step of determining an increment value for a counter dependent on a relative amount of a maximum value of said counter with respect to said frequency ratio comprises looking up a value in a look up table storing a set of said values.

20. A method according to claim 17, said method comprising a further step of in response to changes in at least one of said synchronising frequency and said local frequency re-determining said frequency ratio, said relative amount of said maximum value of said counter with respect to said frequency ratio and said increment value.

21. A method according to claim 17, wherein said step of determining said ratio between said local frequency and said synchronising frequency comprises starting a count in response to said synchronising count value incrementing and incrementing said count in response to said local clock signal.

22. A count value generator means for generating an output count value comprising:

an input means for receiving a synchronising count value that increments at a synchronising frequency;

a counting means for incrementing in response to a local clock signal running at a local frequency, said local frequency being faster than said synchronising frequency; and an interpolating means for determining a frequency ratio between said local frequency and said synchronising frequency and for determining an increment value for said counting means dependent on a relative amount of a maximum value of said counting means with respect to said frequency ratio;

wherein said counting means is for generating a count value comprising a plurality of bits, said plurality of bits comprising a predetermined number of bits representing integer values and being output as said lower order bits of said output count value, said counting means being for incrementing by said increment value in response to said local clock signal such that said counting means attains said maximum value or a value close to said maximum value prior to said synchronising count value incrementing, said counting means being configured to be reset in response to said synchronising count value incrementing; and output means for outputting said synchronising count value as higher order bits of said count value and said predetermined number of bits representing integer values generated by said counting means as said lower order bits of said count value.

* * * * *